United States Patent [19]

Rinderer

[11] Patent Number: 4,907,766
[45] Date of Patent: Mar. 13, 1990

[54] PIPE POSITIONING AND SUPPORT SYSTEM
[75] Inventor: Eric R. Rinderer, Highland, Ill.
[73] Assignee: B-Line Systems, Inc., Highland, Ill.
[21] Appl. No.: 301,318
[22] Filed: Jan. 24, 1989
[51] Int. Cl.[4] ............................................. F16L 3/22
[52] U.S. Cl. ........................................ 248/57; 248/59; 248/70; 248/74.1
[58] Field of Search ...................... 248/56, 57, 58, 59, 248/62, 65, 68.1, 70, 71, 73, 74.1, 74.2, 74.3, 74.4, 207, 222.1

[56] References Cited

U.S. PATENT DOCUMENTS

| | | | |
|---|---|---|---|
| 1,056,759 | 3/1913 | Mallery | 248/57 |
| 1,431,662 | 10/1922 | Horning | 248/65 |
| 2,214,388 | 9/1940 | Summers | 248/57 |
| 2,295,888 | 9/1942 | Bucknell | 248/57 |
| 2,379,893 | 7/1945 | Ellinwood | 248/222.1 |
| 2,549,346 | 4/1951 | Tormo | 248/58 |
| 2,628,799 | 2/1953 | Aaby | 248/298 |
| 2,773,708 | 12/1956 | Beyerle | 248/57 |
| 2,880,949 | 4/1959 | Fuss | 248/73 |
| 2,913,740 | 11/1959 | Eldridge | 248/68.1 |
| 2,917,804 | 12/1959 | Barron | 248/57 |
| 2,972,460 | 2/1961 | Kenyon | 248/68.1 |
| 2,992,800 | 7/1961 | Madson | 248/74.1 |
| 2,997,265 | 8/1961 | Weiss | 248/68.1 |
| 3,021,103 | 2/1962 | Beyerle | 248/57 |
| 3,092,361 | 6/1963 | Cook | 248/56 |
| 3,366,356 | 1/1968 | Fisher | 411/511 |
| 3,425,655 | 2/1969 | Cogdill | 248/544 |
| 3,454,247 | 7/1969 | Geisinger | 248/56 |
| 3,606,217 | 9/1971 | Leiferman | 248/57 |
| 3,632,069 | 1/1972 | Thayer | 248/56 |
| 3,718,307 | 2/1973 | Albanese | 248/57 |
| 3,944,175 | 3/1976 | Kearney | 248/59 |
| 4,146,074 | 3/1979 | Kowalski | 411/970 |
| 4,192,477 | 3/1980 | Decky | 248/56 |
| 4,259,542 | 3/1981 | Tehan | 248/56 |
| 4,267,994 | 5/1981 | Lynch | 248/74.1 |
| 4,550,451 | 11/1985 | Hubbard | 248/68.1 |

FOREIGN PATENT DOCUMENTS

| | | | |
|---|---|---|---|
| 218515 | 3/1957 | Australia | 248/57 |
| 2236385 | 1/1975 | France | 248/58 |
| 1361087 | 7/1974 | United Kingdom | 248/222.1 |

Primary Examiner—Ramon O. Ramirez
Assistant Examiner—Robert A. Olson
Attorney, Agent, or Firm—Senniger, Powers, Leavitt and Roedel

[57] ABSTRACT

A system for positioning and supporting a pipe or conduit in fixed position relative to a structural element, comprising a support bar to be secured to the structural element having openings therein spaced at regular intervals lengthwise of the bar, and a thin flat bracket member to be affixed to the support bar in a selected position lengthwise of the bar. The bracket member is formed with at least one L-shaped lug and is adapted to be inserted through a selected opening of the support bar and moved relative to the bar from a preliminary position to a final position wherein the lug extends beyond the opening and overlaps the bar with a marginal edge portion of the opening received in the space between the lug and the bracket member. A locking member integral with the bracket member is adapted for movement through another opening of the support bar when the bracket member is in its final position thereby to affix the bracket to the support bar in a selected longitudinal position with respect to the bar without the use of separate fasteners.

51 Claims, 5 Drawing Sheets

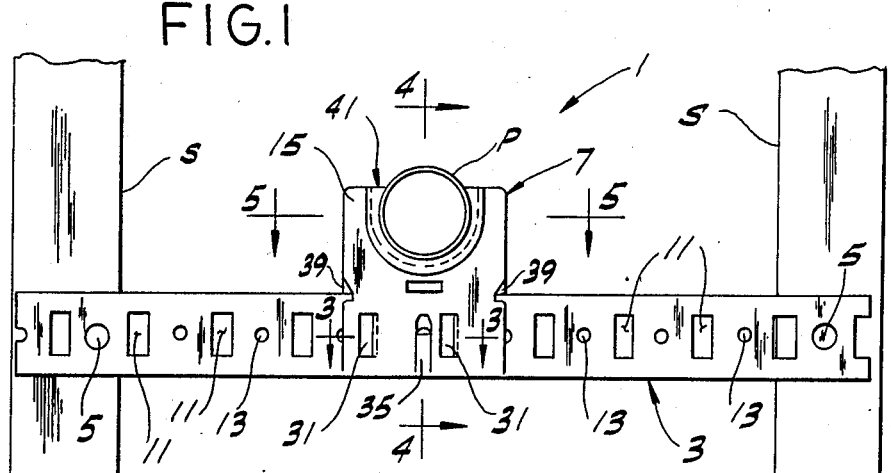
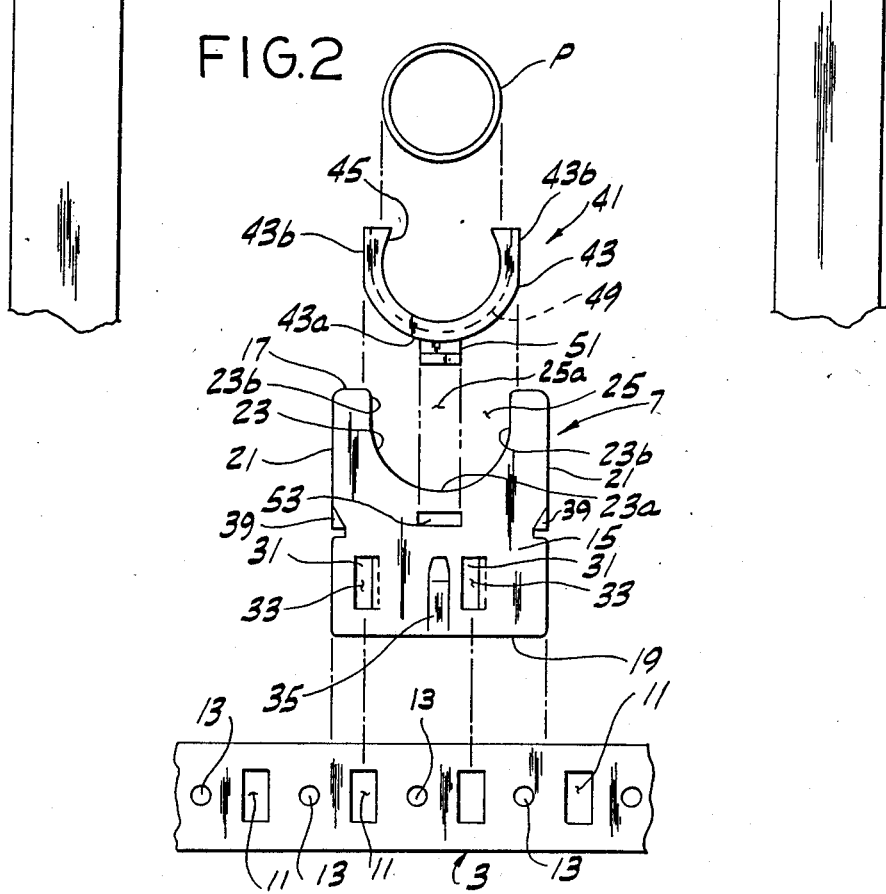

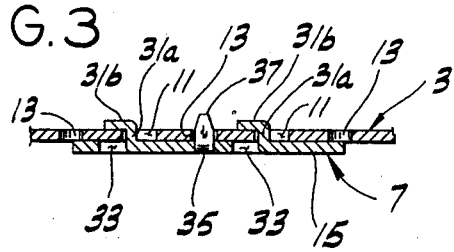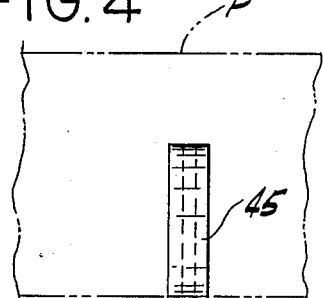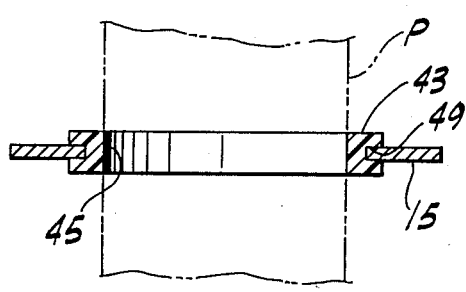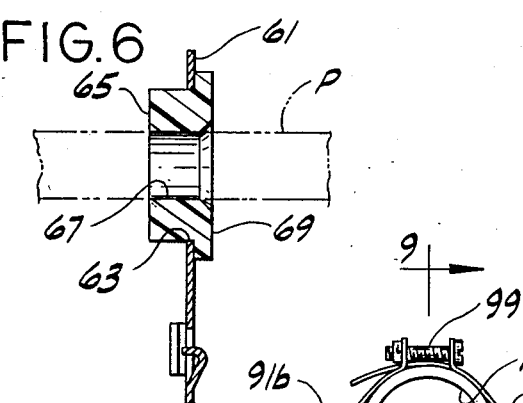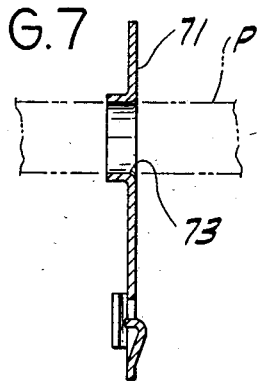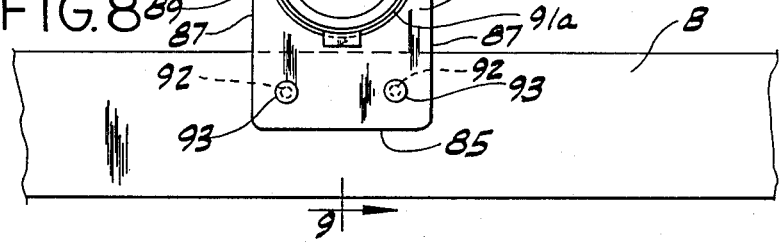

PIPE POSITIONING AND SUPPORT SYSTEM

BACKGROUND OF THE INVENTION

This system relates to an improved system for positioning and supporting plumbing Pipes, electrical conduit and the like.

Various systems have been used to provide either temporary or permanent support to pipes, conduits and other types of lines. It is important that such a system be capable of being installed in a minimum of time and with assurance that the member being supported will not move from its desired position. It is also desirable that the support system be able to accommodate plastic or metal conduit, pipes or other elongate members of varying diameters, and that the member to be supported be able to be precisely positioned at virtually any location within a wide range of locations. Preferably, the system should be capable of supporting pipes and the like on a variety of structural members, such as framing (e.g., wall studs), suspension rods, channels and wall surfaces, with the pipes at any one of various desired orientations relative to the structural member.

Reference may be made to U.S. Pats. 4,550,451, 3,021,103, 3,718,307, 2,628,799, 1,056,759, 3,425,655, 3,454,247, 3,632,069, 4,259,542, 4,267,994, 4,192,477, 3,366,356, 3,092,361 and 2,917,804 for patents showing support systems generally in the field of this invention.

SUMMARY OF THE INVENTION

Among the several objects of this invention may be noted the provision of an improved support system for positioning and supporting pipes, conduit and virtually any type of elongate member in desired position; the provision of such a system which has a minimum number of components but which can accommodate elongate members having different diameters; the provision of such a system which can be used equally as well with metal and plastic elongate members; the provision of such a system which is easy to install and which minimizes the use of fasteners; the provision of such a system which is adapted for use in conjunction with a variety of structural support elements, including wall studs, suspension rods, channels, wall surfaces, and other support elements; and the provision of such a system which is relatively simple in design for economical manufacture.

Briefly, a support system of this invention is adapted for supporting an elongate member, such as pipe or conduit, in fixed position. The system comprises a support bar adapted to be secured to one or more structural elements. The support bar has a first plurality of openings therein spaced at regular intervals lengthwise of the bar and a second plurality of openings therein spaced at regular intervals lengthwise of the bar. The system also includes a bracket adapted to be affixed to the support bar in a selected position lengthwise of the bar. The bracket comprises a thin flat bracket member of one-piece construction formed from sheet metal and having an opening therein for receiving said elongate member, and at least one lug integral with the bracket member. The lug is generally L-shaped and has an inner portion projecting outwardly from one face of the bracket member and an outer portion extending generally at right angles to the inner portion spaced from and generally parallel to said one face of the bracket member. The lug is adapted to be inserted through a selected opening of the first plurality of openings and the bracket then moved relative to the support bar from a preliminary position to a final position wherein the outer portion of the lug extends beyond the selected opening and overlaps the bar with a marginal edge portion of the selected opening received in the space between the outer lug portion and the bracket member. A locking member integral with the bracket member is adapted for movement through an opening of said second plurality of openings in the support bar when the bracket is in said final position thereby to prevent the bracket from being moved relative to the bar back to its preliminary position, the arrangement being such that the bracket is affixed to the support bar in a selected longitudinal position with respect to the bar without the use of separate fasteners.

In a second aspect of the invention, the system comprises a support bar generally L-shaped in transverse section with first and second legs generally at right angles to one another, the first leg having a plurality of openings therein with the openings spaced at intervals lengthwise of the bar. First mounting means is provided on the support bar for mounting of the bar on a rod with the support bar generally at right angles to the rod. The system also includes a bracket member having an opening therein for receiving an elongate member to be supported, and fastener means cooperable with a selected opening in the first leg of the support bar for affixing the bracket member to the bar in a selected position lengthwise of the bar.

In a third aspect of the invention, the system comprises a thin flat bracket member of one-piece construction formed from sheet metal and having a rounded notch therein adapted to receive an elongate member to be supported. The notch has edge means comprising an arcuate edge extending approximately 180 degrees for engagement with approximately one-half the circumference of the elongate member. Relatively wide flange means comprising an arcuate flange portion along the arcuate edge of the notch projects laterally outwardly from one face of the bracket member. The arcuate flange portion has an arcuate length generally corresponding to that of the arcuate edge of the notch. A cantilever member projects laterally outwardly with respect to the one face of the bracket member beyond the arcuate flange portion a distance sufficient to enable the elongate member to be attached to the bracket member by wrapping fastening means around the elongate member and the cantilever member. The arcuate flange portion and cantilever member are dimensioned to provide a surface area sufficient to permit a metal elongate member to be heat-bonded thereto for rigidly attaching the metal elongate member in fixed position relative to the bracket member.

In a fourth aspect of the invention, the system comprises a thin flat bracket member of one-piece construction formed from sheet metal and having an upper edge, a lower edge, opposite side edges and edge means bounding a notch in the bracket member extending down from the upper edge of the bracket member. The system also includes a retaining member of generally U-shape having a base and a pair of arms extending upwardly from the base adapted for receiving said elongate member therebetween. The retaining member is a molded member of resilient material having an arcuate inner surface extending more than 180 degrees for engagement with more than one-half of the circumference of the elongate member. The arms of the retaining member are adapted to resiliently spread apart to permit passage of the elongate member downwardly between the upper free ends of the arms to a position wherein the elongate member is seated against the base of the retaining member, the arms then being adapted to resiliently spring toward one another to a retaining position in which the arms are disposed for retaining the elongate member therebetween with said arcuate inner surface of the retaining member in engagement with more than one-half the circumference of the elongate member. The retaining member, with the elongate member retained between said arms, is adapted to be inserted downwardly into a seated position in the notch in the bracket member. Detent means on the retaining member is engageable with the bracket member for releasably holding the retaining member in its seated position in the notch, the retaining member and notch being so dimensioned relative to one another that when the retaining member is held in its said seated position in the notch the arms of the retaining member are prevented from spreading apart from their retaining position whereby the elongate member cannot be removed from the notch by pulling it upwardly between the upper ends of the arms.

Other objects and features will be in part apparent and in part pointed out hereinafter.

BRIEF DESCRIPTION OF THE DRAWINGS

FIG. 1 is an elevational view showing a system of the present invention mounting a conduit in fixed position relative to two structural members (e.g., studs);

FIG. 2 is an exploded view illustrating various components of the system, including a support bar, a bracket and a retainer;

FIG. 3 is an enlarged horizontal section on line 3—3 of FIG. 1;

FIG. 4 is an enlarged vertical section on line 4—4 of FIG. 1;

FIG. 5 is an enlarged horizontal section on line 5—5 of FIG. 1;.

FIGS. 6 and 7 are sectional views of alternative bracket members for use with the support bar of FIG. 1;

FIG. 8 is a view of an alternative bracket member attached directly to a structural member;

FIG. 10 is an elevational view showing different components of the system, including an angle bar mounted generally at right angles on a support rod, and various brackets mounted on the angle bar;

FIG. 12 is a vertical section on line 12—12 of FIG. 10;

FIG. 13 is a vertical section on line 13—13 of FIG. 10;

Corresponding parts are designated by corresponding reference numerals throughout the several views of the drawings.

DESCRIPTION OF THE PREFERRED EMBODIMENTS

Figure 9:
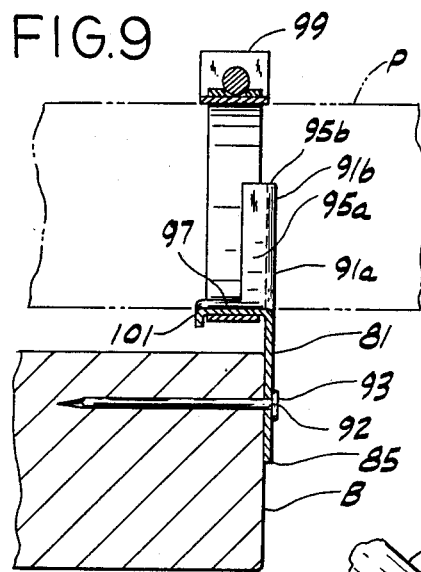
FIG. 9 is a vertical section on line 9—9 of FIG. 8.
Figure 11:
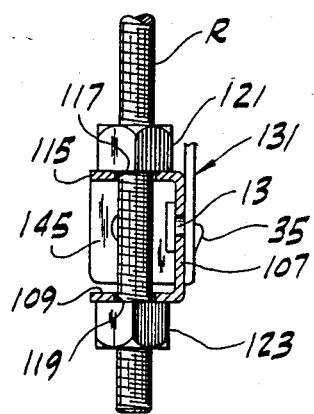
FIG. 11 is a vertical section on line 11—11 of FIG. 10.

Referring now to the drawings, and first more particularly to FIG. 1, there is generally indicated at 1 a system of the present invention for supporting an elongate member, such as a pipe P of circular cross section, in fixed position relative to a pair of structural elements which, as illustrated, may be conventional wood studs S, although it will be understood that the system of this invention is adapted for use with other types of structural elements (e.g., framing members, walls and other flat surfaces, rods, channels, pipes, etc.), as will appear. Two components of the system 1 are shown in FIG. 1, the first being a support bar, generally designated 3, attached at its ends to the studs S by suitable fasteners 5, and the second being a bracket, designated in its entirety by the numeral 7, adapted to be affixed to the support bar in a selected position lengthwise of the bar for supporting the pipe P in the desired position.

The support bar 3 is a relatively thin flat metal strip having a first plurality of relatively large, rectangular openings therein (each such opening being designated 11) spaced at regular intervals lengthwise of the strip and a second plurality of smaller circular openings therein (each such opening being designated 13), also spaced at regular intervals lengthwise of the strip. As shown, the rectangular openings 11 alternate with the circular openings 13 lengthwise of the bar. The circular openings 13 are sized for receiving suitable fasteners 5 (e.g., nails or screws) for securing the support bar 3 to the appropriate structural elements. The rectangular openings 11 are sized for attachment of the bracket 7 to the bar 3 in the manner described below. The support bar may be initially provided as a relatively long strip which may then be cut to suitable length, depending on the situation, or it may be provided in suitable selected lengths corresponding to standard stud spacings, for example. The circular openings 13 are spaced sufficiently close together to accommodate virtually any spacing between the studs S.

The bracket 7 comprises a relatively thin flat bracket member 15 of one-piece construction formed (e.g., stamped) from sheet metal. The bracket member is generally rectangular in shape, having an upper edge 17, a lower edge 19, opposite side edges 21, and edge means 23 bounding an opening for receiving the pipe, the opening as shown in FIG. 1 being a notch 25 extending down from the upper edge 17 of the bracket member. Edge means 23 comprises a rounded generally semi-circular lower edge 23a and a pair of relatively straight upper edges, each designated 23b. The bracket member has two L-shaped lugs 31 struck from the bracket member on one face of the bracket member, the formation of the lugs creating two generally rectangular openings 33 in the bracket member. As shown in FIG. 3, each lug 31 has an inner portion 31a projecting outwardly from the stated one face of the bracket member and an outer portion 31b extending generally at right angles to the inner portion and generally parallel to the stated one face of the bracket member, the spacing between the outer lug portion and the bracket member being only slightly more than the thickness of the support bar 3.

The spacing between the two lugs 31 of the bracket member 7 corresponds to the spacing between two adjacent rectangular openings 11 in the support bar 3 so that the two lugs may be inserted through two selected rectangular openings (depending on the desired position of the bracket member lengthwise of the support bar) and then moved lengthwise of the bar from a preliminary position in which the lugs are centered in the openings to a final position (FIG. 3) wherein the outer portion 31b of each lug extends beyond its respective opening 11 and overlaps the bar 3 with a marginal edge portion of the opening 11 snugly received between the outer lug portion 31b and the bracket member 15. The bracket member is positively stopped in its stated final position by the engagement of the inner portion 31a of each lug with the straight side edge of a respective rectangular opening 11 in the support bar. It will be noted that the height (width) of each lug 31 is only slightly less than the height of a respective rectangular opening 11 so that when the bracket member is in its stated final position, vertical movement of the bracket member 15 relative to the support bar is substantially prevented.

Indicated at 35 is a locking member formed as an integral cantilever part of the bracket member between the two lugs 31. The locking member 35 comprises a flexible but non-resilient arm attached at one end (its lower end as viewed in FIGS. 1 and 4) to the bracket member, and a finger 37 at the other (upper) end of the arm extending outwardly generally at right angles to the arm on the same side of the bracket member as the two lugs 31. The cantilever arm 35 is so positioned relative to the two lugs that when the bracket member 15 is in its stated final position, the outwardly projecting finger 37 of the arm is in register with the circular opening 13 in the support bar 3 between the two rectangular openings 11 in which the lugs are located. The arrangement is such that the arm 35 is adapted to be manually and non-resiliently bent toward the support bar to a position wherein the finger 37 projects through the aligned circular opening 13. The fit of the finger 37 in opening 13 is a relatively close clearance fit, which serves to prevent the bracket member from being moved lengthwise relative to the support bar back to the stated preliminary position. With the lugs 31 and finger 37 in respective openings 11, 13, therefore, the bracket member is securely affixed to the support bar in the desired position lengthwise of the bar, all without the use of separate fasteners such as screws. It is contemplated, however, that a fastener such as a screw could be used in addition to or in lieu of the cantilever arm in situations where greater strength is needed to secure the bracket member in its final position.

As shown in FIGS. 1 and 2, a pair of tabs, each designated 39, are bent from opposite vertical side edges of the bracket member 7. These tabs 39 are engageable with the top longitudinal edge of the support bar 3 when the bracket member is installed on the bar and constitute means for holding the bracket member against rotation relative to the bar on the axis of pipe P.

Indicated generally at 41 in FIGS. 1-4 is means for retaining the pipe P in the notch 23 in the bracket member 15. As shown, this means comprises a retaining member 43 of generally U-shape corresponding to the shape of the notch in the bracket member and having a generally semi-circular base 43a and a pair of arms, each designated 43b, extending up from the base adapted for holding the pipe therebetween. The retaining member 43 is preferably a molded member of resilient synthetic resin material (e.g., nylon) having an arcuate inner surface 45 extending more than 180 degrees of a circle for engagement with more than one-half of the circumference of the pipe P. The spacing between the outer (upper) free ends of the arms 43b is less than the diameter of the pipe P so that, when the retaining member is applied to the pipe, the arms of the retaining member are adapted resiliently to spread apart to permit passage of the pipe downwardly between the upper ends of the arms to a position wherein the pipe is fully seated against the base 43a of the retaining member, the arms then being adapted to resiliently spring or snap toward one another to a retaining position in which the arms are disposed for retaining the pipe therebetween with the arcuate inner edge 45 of the retaining member in engagement with more than one-half of the circumference of the pipe. Preferably, the retaining member is so dimensioned relative to pipe P that the arms are adapted to apply a gripping or clamping force to the pipe when the pipe is fully seated in the retaining member.

Groove means in the form of a single continuous groove or channel 49 is provided in the outer periphery of the retaining member. The groove is adapted for receiving the edges 23a, 23b of the bracket member 15 bounding the notch thereby to mount the retaining member in the notch 25, the groove being sized for a relatively close fit of the notch edges therein. The bracket member 15 is installed in the notch 25 by moving the retaining member 43 downwardly in the plane of the notch (i.e., in the plane of the paper as viewed in FIG. 2) to pass first through the upper part or mouth 25a of the notch and then fully into the notch until it is properly seated. The retaining member 43 and notch 25 are so dimensioned relative to one another that when the retaining member is fully seated in the notch, the arms 43b of the retaining member are held in gripping relation to the pipe P and prevented from spreading apart from their stated retaining position, the net effect being that the pipe P is firmly held against axial movement relative to the bracket member 15 and cannot be removed from the notch by pulling it upwardly between the upper ends of the arms. The retaining member (and thus the pipe P) is releasably held in the notch 25 by detent means which prevents movement of the retaining member back through the mouth 25a of the notch. This detent means comprises an integral spring detent 51 on the base 43a of the retaining member 43 adapted to snap into an opening 53 in the bracket member disposed below the bottom of the notch. As shown best in FIG. 4, the spring detent comprises an integral resilient extension 51a of the base projecting down from the base and having a projection 51b at its lower end adapted to snap through the opening 53 in the bracket member.

In use, the retaining member 41 is first applied to the pipe P (or other elongate element) and the combination then inserted downwardly into the notch 25 in the bracket member 15 to a seated position (see FIG. 1) wherein the base 43a and arms 43b of the retaining member are in engagement with corresponding edges 23a, 23b of the notch. As the retaining member arrives at its fully seated position, the spring detent 51 snaps into opening 53 to lock the retaining member in place. As mentioned, with the retaining member in this position, the pipe P is firmly held against axial movement and cannot be removed from the notch. It will be observed that the metal bracket member 15 rather than the retaining member 43 carries the full load of the pipe P. This is true whether the bracket is mounted vertically as shown in FIG. 1, or sideways (i.e., with the notch 25 opening horizontally), or any position in-between, since the base 43a and arms 43b of the retaining member are fully supported by the edges 23a, 23b of the bracket member bounding the notch.

The bracket member 15 of the system 1 may take other forms. For example, the bracket member shown in FIG. 6, designated by the number 61, is identical to the bracket member 15 except that, instead of having a notch, it has a circular opening 63 in it for receiving a cylindric plastic insert 65. The insert has a central axial bore 67 through which the pipe P may be inserted, and a radial flange 69 at one end of the insert engageable with the bracket member. The insert 65 is sized for a press or friction fit in the opening 63 in the bracket and functions to absorb vibration and insulate the pipe from the bracket member, which is particularly important where the pipe is of metal to prevent electrolytic action between the pipe and the bracket member. The bracket member 71 shown in FIG. 7 is essentially identical to the bracket member shown in FIG. 6 except that it has a smaller circular opening 73 in it through which a pipe P, for example, extends without the use of a plastic insert. A flange 75 around the opening 73 prevents the edge of the bracket member from cutting into the pipe.

FIGS. 8 and 9 illustrate another bracket member, designated 81, of the system 1 for supporting a pipe P or the like in fixed position relative to a structural member such as a wood beam B. This bracket member is of one-piece construction formed from sheet metal and is of generally rectangular configuration, having an upper edge 83, a lower edge 85 and opposite side edges 87. The relatively wide bracket member 81 has a rounded opening therein in the form of a notch 89 adapted to receive the pipe P therein. The notch has U-shaped edge means comprising an arcuate edge 91a extending approximately 180 degrees (but no more than 180 degrees) for engagement with approximately one-half the circumference of the pipe, and a pair of substantially straight generally parallel side edges, each designated 91b for supporting the pipe P if the bracket member is mounted with the notch 89 opening sideways rather than upwardly as shown. The bracket member 81 has means comprising two holes 92 in the bracket member for affixing of the bracket member to a support or structural member such as a wood beam B at points spaced in side-to-side direction relative to the bracket member adjacent the lower corners of the bracket member. This is accomplished by driving suitable fasteners 93 (e.g., screws) through the holes 92 in the bracket member and into the beam B. The fact that two fasteners are used at relatively widely spaced locations is advantageous in that this prevents pivoting of the bracket member relative to the beam B for improved stability.

In accordance with one aspect of the present invention, the bracket member 81 of FIGS. 8 and 9 is adapted for use with either plastic or metal pipe or conduit. To this end, the bracket member is formed with flange means comprising a single relatively wide U-shaped flange 95 having an arcuate flange portion 95a along the arcuate edge 91a of the notch and substantially straight side flange portions 95b along notch edges 91b. The flange 95 extends in continuous, uninterrupted fashion along the notch edges 91a, 91b and projects laterally outwardly from one face of the bracket member in a direction generally at right angles to the bracket member (axially of pipe P). The arcuate flange portion 95a has an arcuate length generally corresponding to the arcuate length of notch edge 91a (i.e., approximately 180 degrees).

To enable the bracket member of FIGS. 8 and 9 to be used with plastic pipes, a cantilever member 97 at the base of the notch 89 projects laterally outwardly with respect to the bracket member beyond the flange 95. The cantilever member 97 is integrally formed with the arcuate flange portion 95a, the result being that both the flange and cantilever member may be formed in a single die-stamping operation with only a minimum of waste material. The cantilever member is curved in side-to-side direction on an arc generally corresponding to the arc of the arcuate flange portion 95a. Suitable fastening means 99 (e.g., a band clamp or tie) may be wrapped around the pipe and the cantilever member as illustrated in FIG. 9 to secure the pipe in fixed position in the notch. As indicated at 101, the outer end of the cantilever member is bent radially outwardly away from the pipe P to ensure that the fastening means 99 does not slip off the cantilever member. The arcuate flange portion 95a and the cantilever member 97 have contiguous surfaces which provide a continuous surface area sufficient for enabling a metal pipe to be heat-bonded thereto (e.g., soldered) for rigidly attaching the pipe in fixed position relative to the bracket member. For example, the arcuate flange portion 95a may have a width of about ¼" and the cantilever member 97 may have a length (axial dimension) of about ⅜" and a width of about ⅜".

It will be understood that the bracket member 81 of FIGS. 8 and 9 can be modified for use in connection with various types of structural elements. For example, the bracket member can be configured to have the lugs 31 and locking member 35 of bracket member 15 for mounting on support bar 3.

Another component of the system 1 is shown in FIGS. 10-13 as comprising a support or angle bar, designated in its entirety by the reference numeral 105, which is L-shaped in transverse section with first and second legs designated 107 and 109, respectively, generally at right angles to one another. The angle bar has an integral rectangular mounting flange 115 generally midway between the ends of the angle bar extending from the first (vertical) leg 107 of the bar generally parallel to the second leg 109 and spaced therefrom (see FIG. 11). This flange 115 and the second (horizontal) leg 109 of the bar have aligned circular holes 117, 119 therein for reception of a vertical support rod R through the holes to mount the angle bar on the rod. Nuts 121, 123 threaded on the rod immediately above the mounting flange 115 and below the horizontal leg 109 of the angle bar maintain the bar in fixed position on the rod. It will be understood, therefore, that the mounting flange 115 and horizontal leg 109 comprise first mounting means for mounting of the angle bar on the rod R with the bar generally at right angles to the rod.

The first leg 107 (the vertical leg as shown in FIGS. 10-13) of the angle bar 105 has a series of openings therein identical to the openings 11, 13 in support bar 3, that is, a first plurality of rectangular openings 11 spaced at regular intervals lengthwise of the angle bar, and a second plurality of smaller circular openings 13 spaced at regular intervals lengthwise of the angle bar and alternating with the rectangular openings. These openings 11, 13 enable one or more brackets (generally designated 131 and 133 in FIG. 10) having L-shaped lugs 31 and locking members 35 of the type previously described to be mounted on the angle bar for supporting horizontal runs of pipe P1, P2 in laterally spaced relation. The brackets 131, 133 may be of any suitable configuration, depending on the size and composition of the pipe to be supported. As illustrated, one bracket 131 (the left one as viewed in FIG. 10) is similar to the bracket shown in FIG. 9 in that it has a notch with a relatively wide flange 137 and a cantilever member 139 for enabling the pipe P1, which may be of plastic, to be fastened to the bracket by means of a band clamp 141 wrapped around the pipe and the cantilever member. The second bracket 133 is essentially identical in construction in that it has a relatively wide flange 143 and a cantilever member 144 so that the pipe P2, which may be of metal, can be heat-bonded to the flange and cantilever member to secure it in fixed position.

Figure 14:
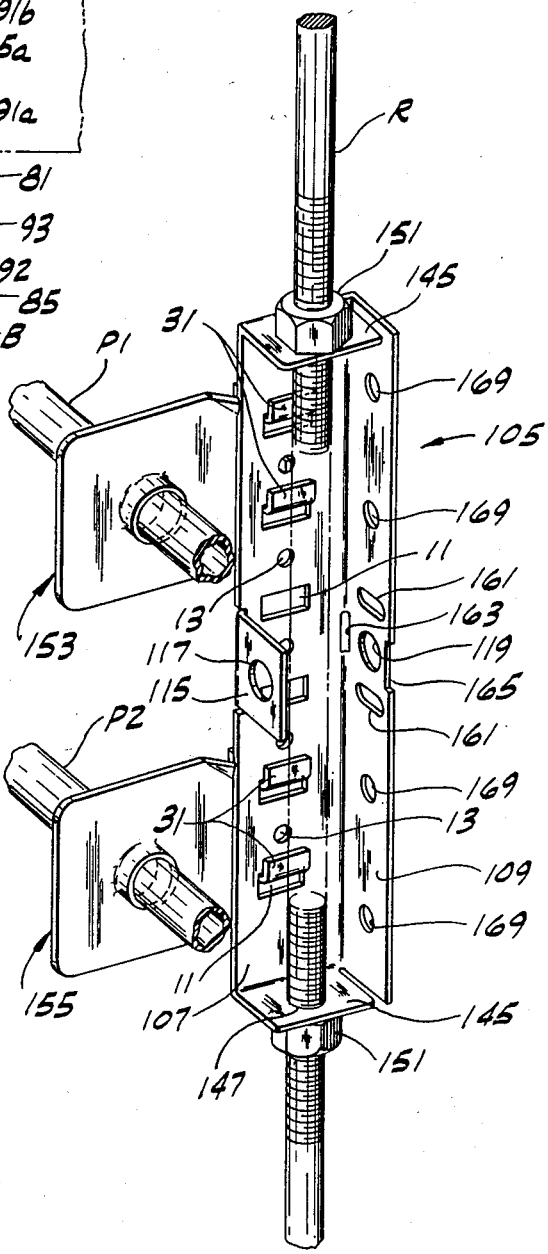
FIG. 14 is a perspective view showing the angle bar of FIG. 10 mounted generally parallel to the support rod.

The angle bar 105 also has a pair of mounting flanges, each designated 145, at opposite ends of the bar formed integrally with the first leg 107 and bent to extend generally at right angles thereto in planes generally perpendicular to the second leg 109. These latter two flanges 145 have aligned holes 147 therein for the reception of a vertical rod R therethrough and constitute second mounting means for mounting of the angle bar with the bar generally parallel to the rod, i.e., vertically as illustrated in FIG. 14. A pair of nuts, each designated 151, threaded on the rod above and below the mounting flanges maintain the angle bar in fixed position on the bar. As illustrated in FIG. 14, one or more brackets 153, 155 similar to the brackets previously described can be mounted on the vertical angle bar to support horizontal runs of pipe P1, P2 one above another in vertically spaced relation.

For reasons which will be explained, the second leg 109 of the angle bar is formed with a pair of slots 161 on opposite sides of the hole 119 which receives the rod of FIG. 10, a slot 163 at the juncture of the two legs 107, 109 immediately adjacent the hole, and a notch 165 in the edge of the second leg 109 opposite the latter slot 163. The second leg 109 also has a plurality of circular openings therein, each designated 169, spaced at intervals lengthwise of the leg (see FIG. 14).

Figure 15:
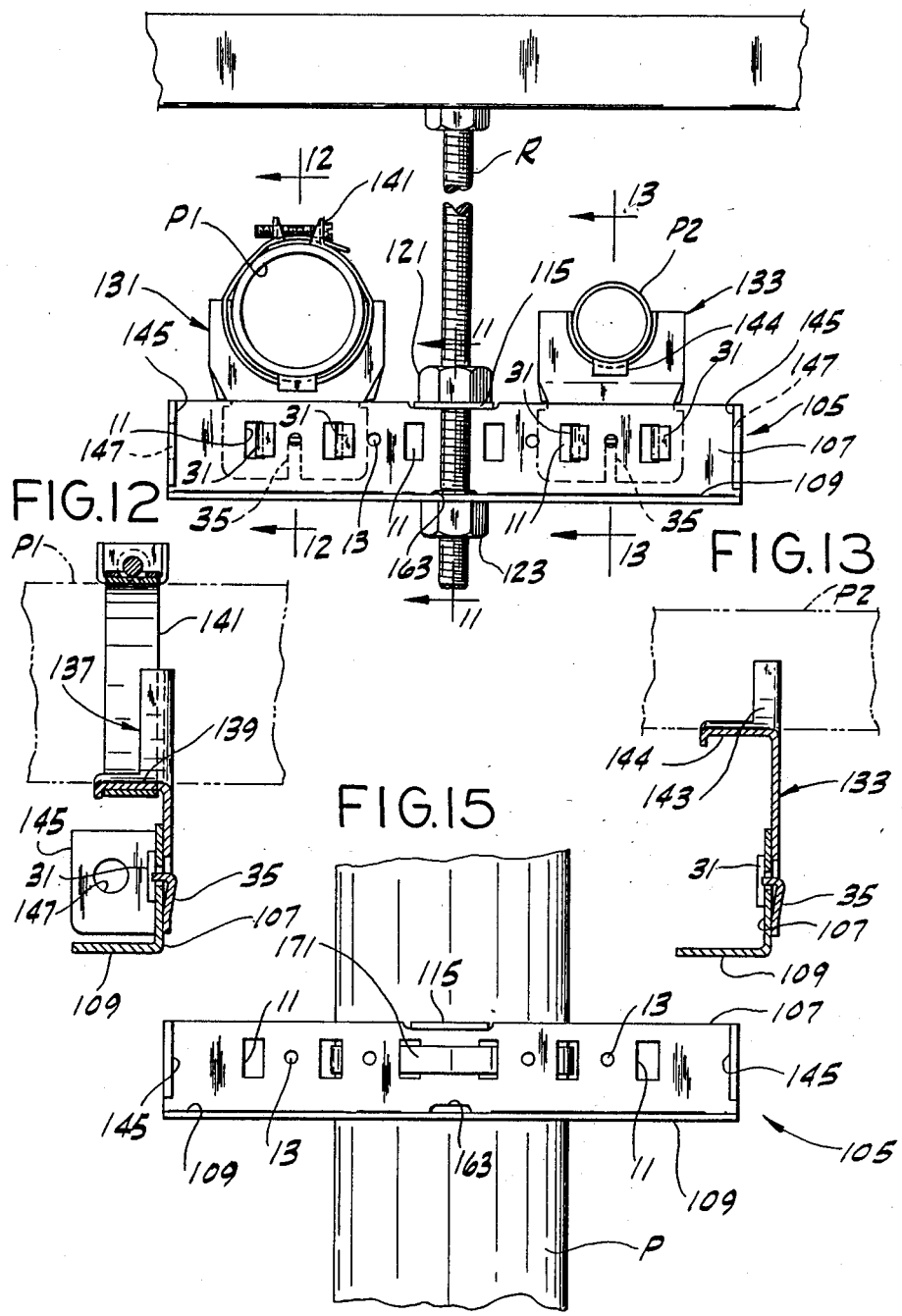
FIGS. 15-17 are elevational views illustrating various alternative uses of the angle bar.
Figure 16:
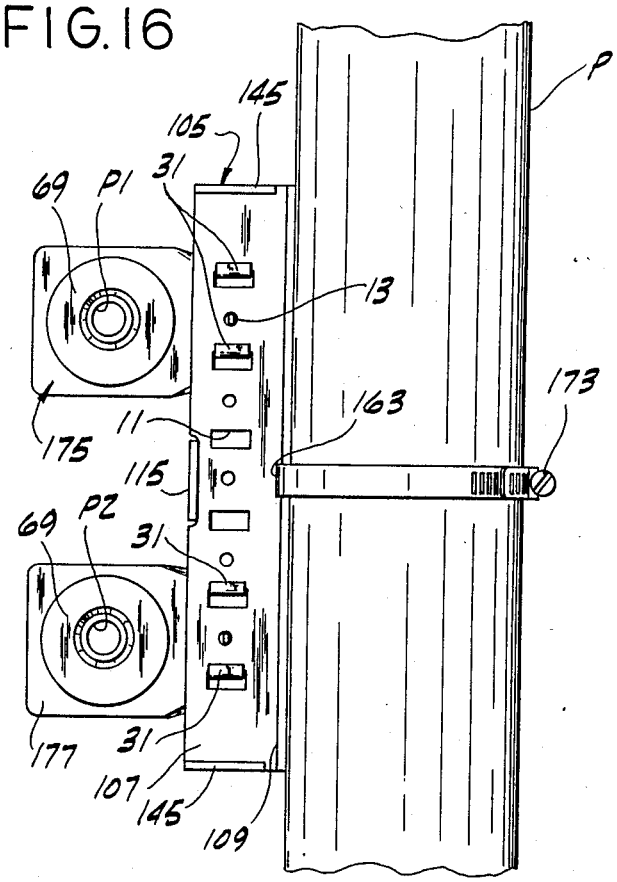
Figure 17:
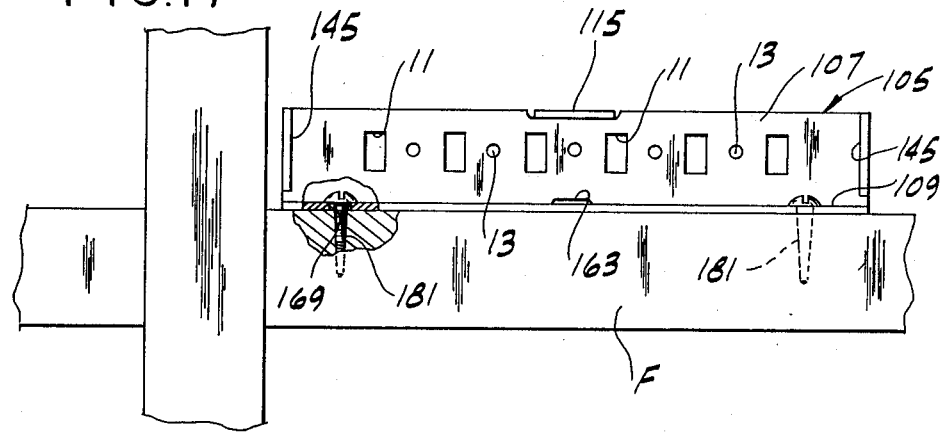

FIGS. 15-17 illustrate other ways the angle bar 105 can be used to support lengths of pipe and/or conduit, for example. Referring to FIG. 15, the angle bar 105 is shown fastened in a generally horizontal position to a vertical member such as a pipe P by means of a band clamp 171 passing through two adjacent rectangular openings 11 in the first (vertical) leg 107 of the angle bar, the first leg of the bar being clamped flush against the pipe. With the angle bar in this position, suitable brackets (not shown) may be used to support parallel runs of conduit, for example, lying generally in a horizontal plane extending at right angles to the pipe P. FIG. 16 shows the angle bar 105 fastened to another vertical member such as a pipe P but with angle bar generally parallel to the pipe and with the second leg 109 of the angle bar flush against the pipe. The angle bar is secured to the pipe by a band clamp 173, for example, passing through the notch 165 and slot 163 in the bar. With the angle bar in this position, suitable brackets 175, 177 may be used to support generally parallel runs of pipe P1, P2 stacked one above the other in a vertical plane generally parallel to the pipe P at one side of the pipe. While not shown, the angle bar 105 may also be clamped to a structural member such as a pipe in a position wherein the angle bar is generally perpendicular to the pipe and the second leg 109 of the bar is flush against the pipe. This may be accomplished by passing a band clamp or the like through the two slots 161 in the second leg 109 of the bar and thence around the pipe. Suitable brackets may then be used to support one or more runs of conduit, for example, in a plane generally parallel to the pipe and at one side of the pipe.

FIG. 17 illustrates the angle bar 105 fastened directly to a frame member (e.g., wood framing F) by means of fasteners 181 driven through selected holes 169 in the second leg 109 of the bar into the frame member. Although not shown, the angle bar may also be fastened directly to a structural member in the form of a channel (sometimes referred to in the trade as "strut"). Fastening nuts of the type shown in co-assigned U.S. Pat. No. 4,146,074 may be used in conjunction with such channel to secure members to the channel. The angle bar 105 may be secured in a position spanning the open side of the channel by means of a bolt passing through the opening 119 in the second leg 109 of the bar and thence through the aforementioned fastening nut on the inside of the channel. In this application the angle bar can be secured at virtually any angle relative to the channel.

It will be observed from the foregoing that the components of the present support system 1, that is, that support bar 3, the angle bar 105, and the brackets of various configurations can be used to support elongate members such as pipes and conduit, whether of plastic or metal, in a variety of different configurations with only a minimum of effort and tools. The number of different parts needed in stock are minimized since the support bar and angle bar never vary in design. Moreover, in the event several pipes and/or conduits are supported by the same support bar or angle bar, the centerline spacing between the pipes and/or conduit can be precisely maintained, and because the distances between the openings 11 in the bar are predetermined, measurement to determine the centerline spacing between the pipes and/or conduit is unnecessary.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. A system for positioning and supporting an elongate member, such as pipe or conduit, in fixed position, comprising
   a support bar adapted to be secured to one or more structural elements, said support bar having a first plurality of openings therein spaced at regular intervals lengthwise of the bar and a second plurality of openings therein spaced at regular intervals lengthwise of the bar,
   a bracket adapted to be affixed to said support bar in a selected position lengthwise of the bar, said bracket comprising a thin flat bracket member of one-piece construction formed from sheet metal and having an opening therein for receiving said elongate member,
   at least one lug integral with the bracket member, said lug being generally L-shaped and having an inner portion projecting outwardly from one face of the bracket member and an outer portion extending from the inner portion and spaced from and generally parallel to said one face of the bracket member, said lug being adapted to be inserted through a selected opening of said first plurality of openings and the bracket then moved relative to the support bar from a preliminary position to a final position wherein said outer portion of the lug extends beyond said selected opening and overlaps the bar with a marginal edge portion of the selected open- ing received in the space between the outer lug portion and the bracket member, and a locking member integral with the bracket member and adapted for movement through an opening of said second plurality of openings in said support bar when the bracket is in said final position thereby to prevent the bracket from being moved relative to the bar back to said preliminary position, the arrangement being such that the bracket is affixed to the support bar in a selected longitudinal position with respect to the bar without the use of separate fasteners.

2. A system as set forth in claim 1 wherein said inner portion of the lug projects out from said one face of the bracket member a distance not substantially greater than the thickness of said support bar.

3. A system as set forth in claim 1 wherein the openings of said first plurality of openings are different in size and/or shape from the openings of said second plurality of openings.

4. A system as set forth in claim 1 wherein each opening of said first plurality of openings has a dimension only slightly greater than the width of the outer portion of said lug.

5. A system as set forth in claim 4 wherein said dimension is generally perpendicular to the length of said support bar.

6. A system as set forth in claim 1 further comprising means on the bracket member engageable with a longitudinal edge of the support bar for holding the bracket member against rotation relative to the support bar about an axis corresponding generally to the longitudinal axis of said elongate member.

7. A system as set forth in claim 6 wherein said bracket member has an upper edge, a lower edge and opposite side edges, said means for holding the bracket member against rotation comprising a pair of tabs bent from adjacent opposite side edges of the bracket member for engagement with said longitudinal edge of the support bar.

8. A system as set forth in claim 1 wherein said lug and locking member are so positioned relative to one another and said openings that, upon movement of said bracket member relative to the support bar from said preliminary position, the inner portion of the lug is engageable with an edge of said selected opening to stop said bracket member in said final position wherein said locking member is in register with said opening of said second plurality of openings for movement of said locking member therethrough.

9. A system as set forth in claim 8 wherein said locking member is formed as an integral cantilever part of said bracket member and is adapted to be manually bent to project through said opening of said second plurality of openings.

10. A system as set forth in claim 9 wherein said locking member comprises a non-resilient arm integrally attached at one end to said bracket member and having at its other end a finger extending outwardly generally at right angles to the arm, said arm being adapted to be non-resiliently bent to a position wherein said finger projects through said opening of said second plurality of openings.

11. A system as set forth in claim 1 comprising two identical lugs on said bracket member spaced apart a distance corresponding to the distance between two adjacent openings of said first plurality of openings.

12. A system as set forth in claim 11 wherein said locking member is disposed between said two lugs, and wherein the openings of the first plurality of openings alternate with the openings of the second plurality of openings lengthwise of the bar.

13. A system as set forth in claim 12 wherein the openings of said first plurality of openings are different in size and/or shape from the openings of said second plurality of openings.

14. A system as set forth in claim 1 wherein said opening in said bracket member is a rounded notch adapted to receive said elongate member, said notch having edge means comprising an arcuate edge extending approximately 180 degrees for engagement with approximately one-half the circumference of said elongate member, and flange means comprising an arcuate flange portion along said arcuate edge of the notch projecting laterally outwardly from one face of the bracket member, said arcuate flange portion having an arcuate length generally corresponding to that of said arcuate edge of the notch.

15. A system as set forth in claim 14 wherein said edge means of said notch is generally U-shaped, comprising a pair of substantially straight generally parallel side edges joined by said arcuate edge, said flange means comprising a pair of substantially straight side flange portions along the side edges of the notch.

16. A system as set forth in claim 15 wherein said flange means comprises a single uninterrupted flange.

17. A system as set forth in claim 14 further comprising a cantilever member integrally formed with said arcuate flange portion and projecting laterally outwardly therefrom a distance sufficient to enable said elongate member to be attached to the bracket member by wrapping fastening means around the elongate member and the cantilever member, said arcuate flange portion and said cantilever member having contiguous surfaces which combine to provide a continuous surface area sufficient to permit a metal elongate member to be soldered thereto for rigidly attaching said metal elongate member in fixed position relative to the bracket member.

18. A system as set forth in claim 17 wherein said cantilever member is curved in side-to-side direction on an arc corresponding to the arc of said arcuate flange portion.

19. A system as set forth in claim 18 wherein said cantilever member has a bent end engageable by said fastening means for preventing the fastening means from slipping off said cantilever member.

20. A system as set forth in claim 1 wherein said bracket member has an upper edge, a lower edge, opposite side edges, and edge means bounding said opening in the bracket member, said opening comprising a notch in the bracket member extending down from the upper edge of the bracket member.

21. A system as set forth in claim 20 further comprising means for retaining said elongate member in said notch, said retaining means comprising a retaining member of generally U shape having a base and a pair of arms extending up from the base adapted for receiving said elongate member therebetween, said retaining member being adapted to be inserted into the notch with the elongate member between the arms of the retaining member, and detent means for releasably holding said retaining member in said notch.

22. A system as set forth in claim 21 wherein said detent means comprises a spring detent on the base of the retaining member adapted to snap into an opening in said bracket member.

23. A system as set forth in claim 21 wherein said retaining member is a molded member of resilient material having an arcuate inner surface extending more than 180 degrees for engagement with more than one-half of the circumference of said elongate member, the arms of the retaining member being adapted to resiliently spread apart to permit passage of said elongate member downwardly between the upper free ends of the arms to a position wherein the elongate member is seated against the base of the retaining member, the arms then being adapted to resiliently spring toward one another to a retaining position in which the arms are disposed for retaining the elongate member therebetween with said arcuate inner surface of the retaining member in engagement with more than one-half the circumference of the elongate member.

24. A system as set forth in claim 23 wherein the arms of said retaining member are adapted to grip said elongate member when the retaining member is in said retaining position thereby to inhibit axial movement of said elongate member relative to said bracket member.

25. A system as set forth in claim 23 wherein said retaining member and notch in the bracket member are so dimensioned relative to one another that when the retaining member is in its said seated position in the notch, the arms of the retaining member are prevented from spreading apart from their said retaining position whereby the elongate member cannot be removed from the notch by pulling it upwardly between the upper ends of the arms.

26. A system as set forth in claim 25 further comprising groove means in the periphery of the retaining member for receiving said edge means of the bracket member bounding the notch thereby to mount the retaining member in the notch.

27. A system as set forth in claim 1 wherein said support bar is generally L-shaped in transverse section, having a first and second legs generally at right angles with respect to one another, said first leg having said first and second plurality of openings therein.

28. A system as set forth in claim 27 wherein said second leg has a plurality of holes therein through which fasteners may be driven to fasten the support bar to a support member.

29. A system as set forth in claim 27 wherein said support bar has first mounting means thereon for mounting of the bar on a rod with the support bar generally at right angles to the rod, said first mounting means comprising a mounting flange integrally formed with one of said first and second legs and located generally midway between the ends of the support bar, said mounting flange having a hole for receiving said rod therethrough.

30. A system as set forth in claim 29 wherein said mounting flange extends from said first leg generally parallel to said second leg and spaced therefrom, said mounting flange and said second leg having aligned holes therein for reception of said rod through the holes thereby to mount the support bar on the rod.

31. A system as set forth in claim 30 further comprising a pair of slots in said second leg on opposite sides of said hole in the second leg for receiving said rod, said slots being adapted for receiving a band clamp therethrough for clamping said support bar to a support member such as a pipe with the support bar extending generally perpendicular to the pipe.

32. A system as set forth in claim 31 wherein said openings of said first plurality of openings are generally rectangular in shape whereby a band clamp may be passed through two adjacent openings of said first plurality of openings for clamping said support bar to a support member with the support bar extending generally perpendicular to the pipe.

33. A system as set forth in claim 29 wherein said support bar has second mounting means thereon for mounting of the bar on a rod with the support bar generally parallel to the rod.

34. A system as set forth in claim 33 wherein said second mounting means comprises a pair of mounting flanges at opposite ends of the support bar, said pair of mounting flanges having aligned holes therein for reception of said rod through the holes thereby to mount the support bar on the rod, said mounting flanges being integrally formed with one of said first and second legs and extending from said one leg in the same direction as the other leg.

35. A system as set forth in claim 34 wherein said pair of mounting flanges extend generally at right angles thereto in planes generally perpendicular to said second leg.

36. A system for supporting an elongate member, such as pipe or conduit, in fixed position, comprising
a support bar generally L-shaped in transverse section with first and second legs generally at right angles to one another, said first leg having a plurality of openings therein with the openings spaced at intervals lengthwise of the bar,
first mounting means on the support bar for mounting of the bar on a rod with the support bar generally at right angles to the rod, said first mounting means comprising a mounting flange integrally formed with one of said first and second legs and located generally midway between the ends of the support bar, said mounting flange having a hole for receiving said rod therethrough,
said mounting flange extends from said first leg generally parallel to said second leg and spaced therefrom, said mounting flange and said second leg having aligned holes therein for reception of said rod through the holes thereby to mount the support bar on the rod, and further comprising a pair of slots in said second leg on opposite sides of said hole in the second leg for receiving said rod, said slots being adapted for receiving a band clamp therethrough for clamping said support bar to a support member such as a pipe with the support bar extending generally perpendicular to the pipe,
a bracket member having an opening therein for receiving said elongate members, and
fastener means cooperable with a selected opening in said first leg of the support bar for affixing said bracket member to the bar in a selected position lengthwise of the bar.

37. A system as set forth in claim 36 wherein said bracket member is adapted to be affixed to said support bar with the axis of the opening through the bracket member generally perpendicular to the plane of said first leg of the support bar.

38. A system as set forth in claim 36 wherein said second leg has a plurality of holes therein through which fasteners may be driven to fasten the support bar to a support member.

39. A system as set forth in claim 36 wherein said openings of said plurality of openings in the first leg of the support bar are generally rectangular in shape whereby a band clamp may be passed through two openings of said plurality of openings for clamping said support bar to a support member with the support bar extending generally perpendicular to the pipe.

40. A system as set forth in claim 34 wherein said support bar has second mounting means thereon for mounting of the bar on a rod with the support bar generally parallel to the rod.

41. A system as set forth in claim 40 wherein said second mounting means comprises a pair of mounting flanges at opposite ends of the support bar, said pair of mounting flanges having aligned holes therein for reception of said rod through the holes thereby to mount the support bar on the rod, said mounting flanges being integrally formed with one of said first and second legs and extending from said one leg in the same direction as the other leg.

42. A system as set forth in claim 41 wherein said pair of mounting flanges are integrally formed with said first leg and extend generally at right angles thereto in planes generally perpendicular to said second leg.

43. A system for supporting an elongate member of generally circular cross section, such as pipe or conduit, in fixed position, comprising
a thin flat bracket member of one-piece construction formed from sheet metal having a rounded notch therein adapted to receive said elongate member, said notch having edge means which is generally U-shaped and also includes a pair of substantially straight generally parallel side edges joined by an arcuate edge, comprising an arcuate edge extending approximately 180 degrees for engagement with approximately one-half the circumference of said elongate member,
relatively wide flange means comprising a pair of substantially straight side flange portions along said side edges of said notch and an arcuate flange portion along said arcuate edge of the notch projecting laterally outwardly from one face to the bracket member, said arcuate flange portion having an arcuate length generally corresponding to that of said arcuate edge of the notch, and
a cantilever member integrally formed with said arcuate flange portion and projecting laterally outwardly therefrom a distance sufficient to enable said elongate member to be attached to the bracket member by wrapping fastening means around the elongate member and the cantilever member, said arcuate flange portion and said cantilever member having contiguous surfaces which combine to provide a continuous surface area sufficient to permit a metal elongate member to be soldered thereto for rigidly attaching said metal elongate member in fixed position relative to the bracket member, and
said bracket member having means for affixing of said bracket member to a support at at least two points to prevent pivotal movement of the bracket member relative to the support.

44. A system as set forth in claim 43 wherein said cantilever member is curved in side-to-side direction on an arc corresponding to the arc of said arcuate flange portion.

45. A system as set forth in claim 43 wherein said cantilever member has a bent end engageable by said fastening means for preventing the fastening means from slipping off said cantilever member.

46. A system as set forth in claim 43 wherein said affixing means is adapted for affixing of said bracket member to said support at two points spaced in side-to-side direction relative to the bracket member.

47. A system as set forth in claim 43 wherein said flange means comprises a single uninterrupted flange.

48. A system for supporting an elongate member of generally circular cross section, such as pipe or conduit, in fixed position, comprising
a thin flat bracket member of one-piece construction formed from sheet metal and having an upper edge, a lower edge, opposite side edges, and edges means bounding a notch in the bracket member extending down from the upper edge of the bracket member, said notch having a mouth for entry into the notch,
a retaining member of generally U-shape having a base and a pair of arms extending upwardly from the base adapted for receiving said elongate member therebetween, said retaining member being a molded member of resilient material having an arcuate inner surface extending more than 180 degrees for engagement with more than one-half of the circumference of said elongate member, the arms of the retaining member being adapted to resiliently spread apart to permit passage of said elongate member downwardly between the upper free ends of the arms to a position wherein the elongate member is seated against the base of the retaining member, the arms then being adapted to resiliently spring toward one another to a retaining position in which the arms are disposed for retaining the elongate member therebetween with said arcuate inner surface of the retaining member in engagement with more than one-half the circumference of the elongate member,
said retaining member with said elongate member retained between said arms being adapted to be inserted into the notch of the bracket member by moving the retaining member downwardly in the plane of the notch to pass first through the mouth of the notch and then into the notch to a seated position wherein said base and arms of the retaining member are in engagement with said edge means bounding the notch, and
detent means on the retaining member releasably engageable with the bracket member for preventing movement of the retaining member in the plane of the notch back through the mouth of the notch thereby releasably to hold the retaining member in its said seated position in the notch,
said retaining member and notch being so dimensioned relative to one another that when the retaining member is held in its said seated position in the notch the arms of the retaining member are prevented from spreading apart from their said retaining position whereby the elongate member cannot be removed from the notch by pulling it upwardly between the upper ends of the arms.

49. A system as set forth in claim 48 wherein said detent means comprises a spring detent on the base of the retaining member adapted to snap into an opening in said bracket member.

50. A system as set forth in claim 48 wherein the arms of said retaining member are adapted to grip said elongate member when the retaining member is in said retaining position thereby to inhibit axial movement of said elongate member relative to said bracket member.

51. A system as set forth in claim 50 further comprising groove means in the periphery of the arms of the retaining member for receiving said edge means of the bracket member bounding the notch thereby to mount the retaining member in the notch.

* * * * *

UNITED STATES PATENT AND TRADEMARK OFFICE
CERTIFICATE OF CORRECTION

PATENT NO. : 4,907,766

DATED : March 13, 1990

INVENTOR(S) : Eric R. Rinderer

It is certified that error appears in the above—identified patent and that said Letters Patent is hereby corrected as shown below:

Column 15, claim 43, lines 32-35, "arcuate edge, comprising an arcuate edge extending approximately 180 degrees for engagement with approximately one-half the circumference of said elongate member.", should read ---arcuate edge.---.

Column 15, claim 43, line 40, "face to the", should read ---face of the---.

Signed and Sealed this

Thirteenth Day of October, 1992

Attest:

DOUGLAS B. COMER

Attesting Officer

Acting Commissioner of Patents and Trademarks